(12) United States Patent
Turnbow

(10) Patent No.: US 7,004,525 B1
(45) Date of Patent: Feb. 28, 2006

(54) COMBINATION LIVESTOCK TRAILER AND TRAVEL TRAILER

(76) Inventor: Carl D. Turnbow, P.O. Box 300, Oilton, OK (US) 74052

(*) Notice: Subject to any disclaimer, the term of this patent is extended or adjusted under 35 U.S.C. 154(b) by 84 days.

(21) Appl. No.: 10/855,456

(22) Filed: May 28, 2004

(51) Int. Cl.
B62D 33/04 (2006.01)

(52) U.S. Cl. .................................................. 296/24.31
(58) Field of Classification Search ............. 296/24.31, 296/156–176
See application file for complete search history.

(56) References Cited

U.S. PATENT DOCUMENTS

| | | | |
|---|---|---|---|
| 3,193,321 A | 7/1965 | Rose | |
| 3,380,607 A | 4/1968 | Dale | |
| 3,563,596 A | 2/1971 | Davis | |
| 3,574,388 A | 4/1971 | Stone | |
| 3,651,969 A | 3/1972 | Bledsoe | |
| D249,667 S | 9/1978 | Thompson | |
| 4,127,299 A * | 11/1978 | Blair | 296/164 |
| 4,236,747 A * | 12/1980 | Ratliff | 296/24.4 |
| 4,854,631 A | 8/1989 | Laursen | |
| 4,869,545 A * | 9/1989 | Notermann | 296/157 |
| 4,923,243 A | 5/1990 | Drahos | |
| 5,173,052 A * | 12/1992 | Duncan, Jr. | 434/226 |
| D344,473 S | 2/1994 | Romesburg | |
| 5,505,514 A | 4/1996 | Green | |
| 5,746,473 A * | 5/1998 | Crean | 296/208 |
| 6,135,532 A * | 10/2000 | Martin | 296/61 |
| 6,729,678 B1 * | 5/2004 | Atcravi | 296/168 |
| 6,899,375 B1 * | 5/2005 | Sankrithi et al. | 296/156 |
| 2005/0161974 A1 * | 7/2005 | Atcravi | 296/164 |

* cited by examiner

Primary Examiner—H. Gutman
(74) Attorney, Agent, or Firm—Edward L. White

(57) ABSTRACT

A combination livestock and travel trailer includes a trailer frame having wheels, a base floor and an upper ceiling, living quarters in the front portion of the trailer having a living floor above the base floor and a ceiling in common with the upper ceiling, a livestock portion in the rear portion of the trailer having a floor in common with the base floor and a horse ceiling below the upper ceiling, a first cargo area defined by the space between the horse ceiling and the upper ceiling and a second cargo area defined by the space between the horse ceiling and the upper ceiling. Additional components of the trailer may include a removable cover for the second cargo area, a gravity-fed water system with a fresh water tank in the second cargo area, a solar hot water heater, and fresh, gray, and black water tanks in the first cargo area down the center of the first cargo area with storage compartments along the outside of the trailer.

12 Claims, 5 Drawing Sheets

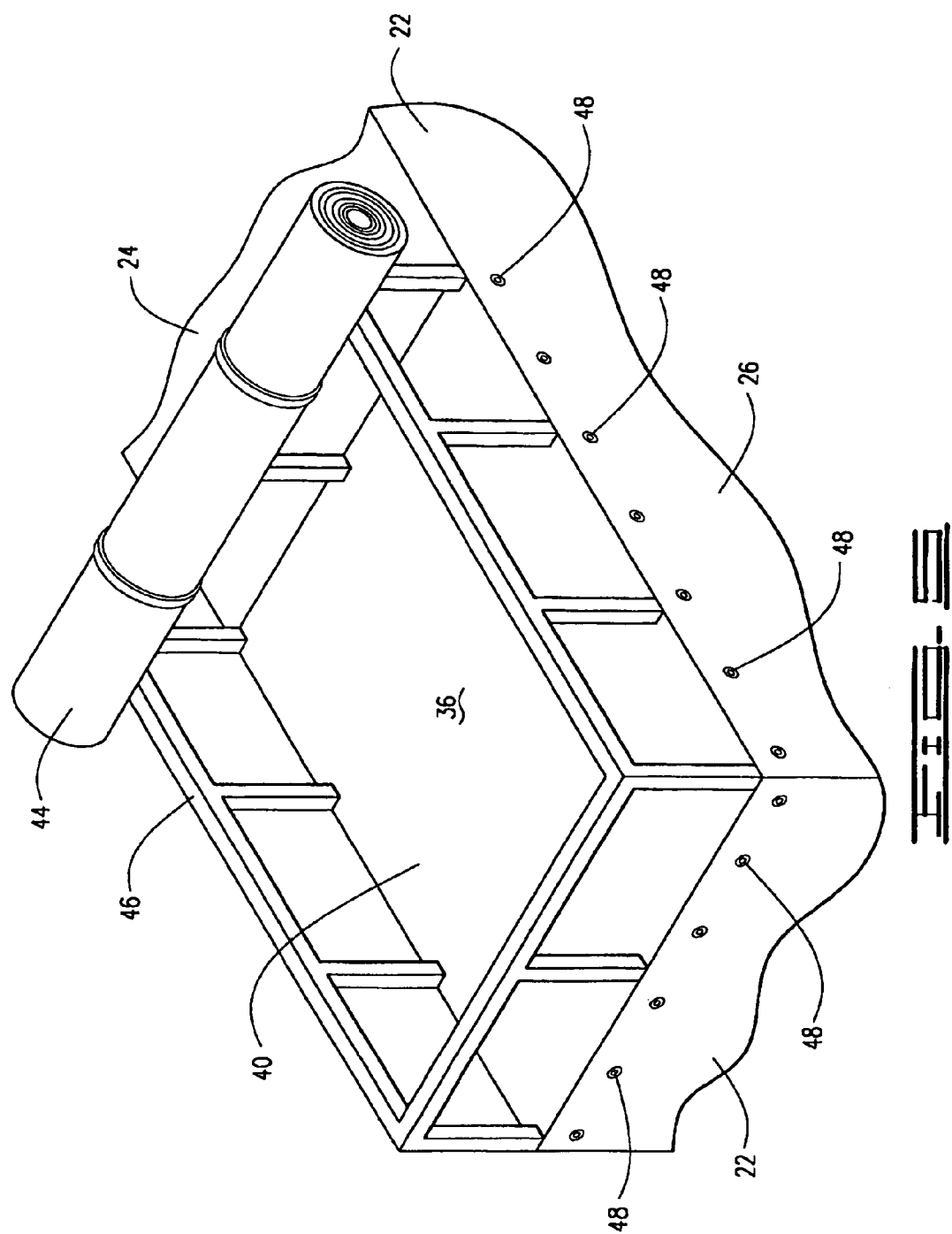

COMBINATION LIVESTOCK TRAILER AND TRAVEL TRAILER

CROSS REFERENCE TO RELATED APPLICATIONS

None

I. BACKGROUND OF THE INVENTION

1. Field of Invention

A combination livestock and travel trailer includes a trailer frame having wheels, a base floor and an upper ceiling, living quarters in the front portion of the trailer having a living floor above the base floor and a ceiling in common with the upper ceiling, a livestock portion in the rear portion of the trailer having a floor in common with the base floor and a horse ceiling below the upper ceiling, a first cargo area defined by the space between the horse ceiling and the upper ceiling and a second cargo area defined by the space between the horse ceiling and the upper ceiling. Additional components of the trailer may include a removable cover for the second cargo area, a gravity-fed water system with a fresh water tank in the second cargo area, a solar hot water heater, and fresh, gray, and black water tanks in the first cargo area down the center of the first cargo area with storage compartments along the outside of the trailer.

2. Description of Prior Art

There are many trailers utilized by persons who travel which provide for accommodation for these people when they travel, generally either self-propelled, as are motor homes, or pull behind trailers either provided as towed trailers or fifth wheel trailers. Generally these trailers provide a kitchen area, a sleeping area or beds, some storage space and lavatories, including sinks, showers and toilets. These trailers are provided with self-contained fuel, potable water and contained sewage usually stored until a sanitary disposal is found.

There are also many trailers used to haul livestock, again embodied by towed behind a vehicle or attaching by a fifth wheel hitch. These have been found completely enclosed, partially enclosed, with roofs and without roofs. Some provide the transport of multiple livestock while some allow for the hauling of a single animal. They have included tack storage areas.

In addition, some combination trailers combine a travel trailer and a livestock trailer together, as may be the case with some of the patents indicated below. However, none of the patents found or recognized possess the same elements as the trailer which is the subject of this current invention, primarily in the first and second cargo areas being provided as indicated. They also do not provide for the storage and containment of the several tanks in the indicated areas within the defined cargo areas, such cargo areas taking advantage of otherwise void spaced in the combination trailer.

The following United States patents were discovered and are disclosed within this application for utility patent. All relate to trailers which include multiple uses and defined by multiple compartments. However, the prior art patents have not addressed the solution to the objective indicated and resolved by the current trailer, which includes separate living and livestock areas and also including the cargo storage areas as defined in the specification and claims below, having a first cargo area under the living area and a second cargo area above the livestock area.

U.S. Pat. No. 3,193,321 to Rose includes a travel trailer with a rear garage for transporting a motorboat, the storage area and the garage sharing the same space. In U.S. Pat. No. 3,380,607 to Dale, U.S. Pat. No. 3,651,969 to Bledsoe, and U.S. Pat. No. 5,505,514 to Green, an elongated trailer frame is indicated, having a travel trailer on the front portion of the trailer frame and an extending boat trailer behind the travel trailer, long enough to launch the boat without extending the travel trailer into the water. A somewhat similar trailer is shown in U.S. Pat. No. 4,923,243, except that the boat loading area of the trailer is in front of the travel trailer living area on the common trailer, the boat loading from the front requiring disengagement of the trailer from the tow vehicle to unload the boat. U.S. Pat. No. 3,563,596 to Davis is similar to Dale, except the trailer is adapted to transport a dune buggy behind the travel trailer portion on a common trailer frame with the travel trailer.

Two design patents, U.S. Pat. Nos. D344,473 to Romesburg and D249,667 to Thompson appear to be trailers having separate areas defined within a common trailer shell with Thompson appearing to have a rear cargo area and Romesburg having a possible side and rear storage area behind apparent access doors. Thompson also has a loading ramp for the livestock area.

U.S. Pat. No. 4,854,631 to Laursen is a combination trave trailer with a recreational vehicle compartment in the rear for placement of an RV for transport, this area underneath a portion of he living area, with two side ramps for loading and unloading the RV. It is supposed small livestock could be placed in this compartment as it is ventilated, but it would not accommodate horses or cattle based on the apparent scale, and it also does not have the defined cargo areas of the current invention. A trailer having retractable wheel serving as both a horse trailer and living quarters within a common area is disclosed in U.S. Pat. No. 3,574,388, which does not include separate living quarters and stock quarters, this trailer also lacking the cargo areas defined in the current invention.

II. SUMMARY OF THE INVENTION

The primary objective of the invention is to provide a combination horse trailer and travel trailer for people, having a livestock area for the transport of livestock with an upper cargo area above the ceiling of the livestock area, and a living area for the accommodation of people with a lower cargo area underneath the floor of the living area, the living area and livestock area upon a common trailer.

A secondary objective of the invention is to provide water storage tanks within the cargo areas for fresh water, grey water and black water, the fresh water having an optional gravity-fed water line, the fresh water being disposed in the upper cargo area, and the grey and black water tanks in the lower cargo area.

A third objective is to provide a tack room between the livestock area and the living area to prevent the sharing of a common wall between the livestock area and the living area for odor and noise reduction.

A fourth objective is to provide the upper cargo area with a removable roof section for access to the cargo area to load and unload feed for the livestock.

In meeting the above objectives, the combination trailer of the present invention includes the trailer frame with a base floor extending above the trailer frame, the floor of the livestock area being in common with the base floor, with a living floor above the base floor in the living area, and a ceiling, with the upper ceiling in the living area being common with the upper ceiling and a horse ceiling below the upper ceiling in the livestock area, with a first cargo area defined by the space between the upper ceiling and the horse ceiling and a second cargo area defined by the space between the living floor and the base floor, wherein the tanks may be included within the cargo areas, the cargo areas having access for stored materials, with an option to make a portion of the upper ceiling removable over the first cargo area for extended access.

III. DESCRIPTION OF THE DRAWINGS

The following drawings are submitted with this utility patent application.

FIG. 5 is an upper perspective view of the first cargo area having a removable upper ceiling.

IV. DESCRIPTION OF THE PREFERRED EMBODIMENT

Figure 1:
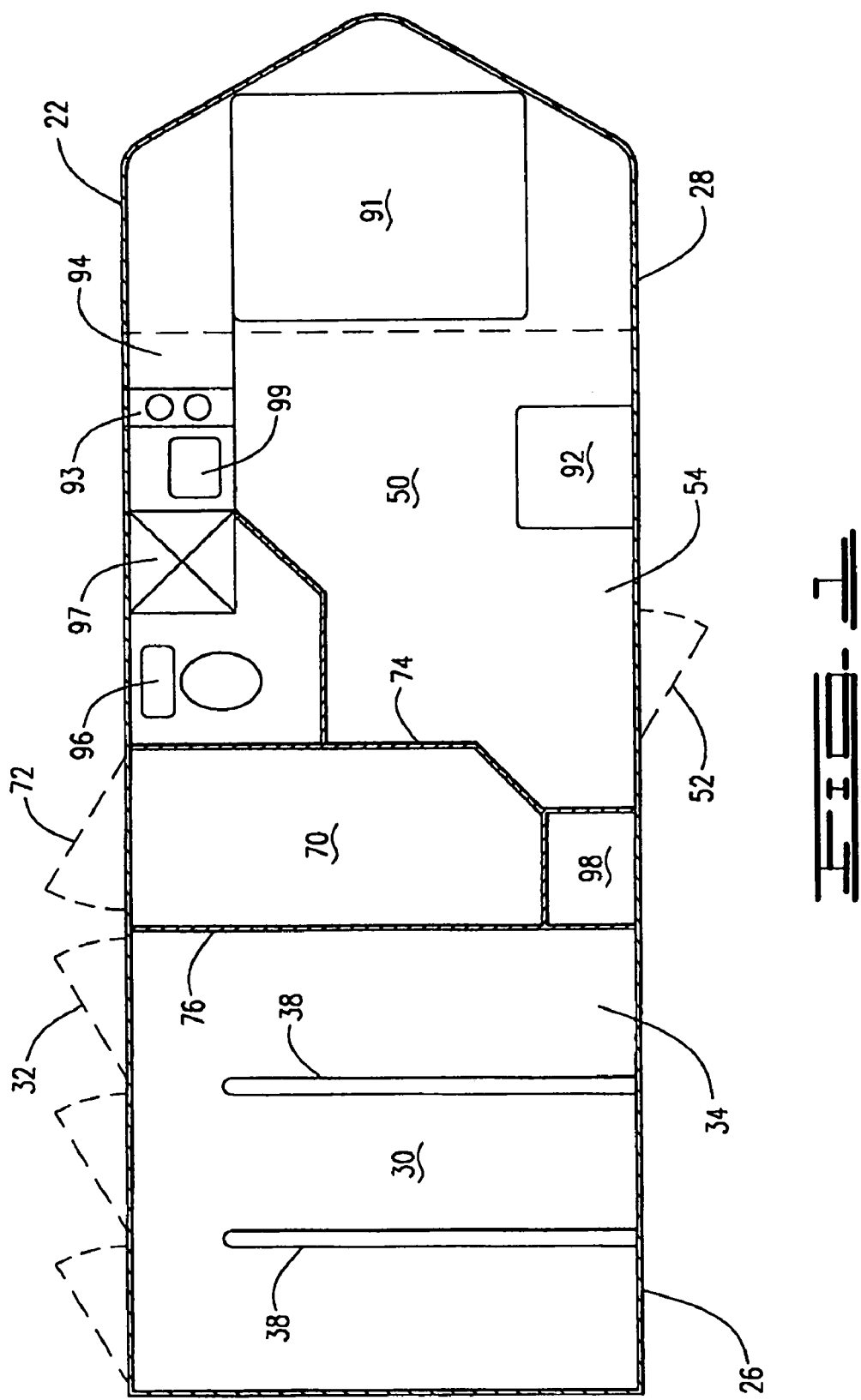
FIG. 1 is a top view of a general interior floor plan of the trailer.

The combination livestock trailer and travel trailer, shown in FIGS. 1–5 of the drawings, is a transport trailer pulled behind a vehicle, providing for the accommodation of people and the transportation and accommodation of livestock during extended travel, the trailer comprising essentially at least one trailer axle 10 upon which is mounted a base floor 20, upward extending outer walls 22, and an upper ceiling 24, the trailer further comprising a livestock area 30 in a rear portion 26 of the trailer, the livestock area defined by a livestock floor 34 in common with the base floor 20, at least one door 32 and a horse ceiling 36 below the upper ceiling 24, with a space between the horse ceiling 36 and the upper ceiling 24 forming a first cargo area 40, a living area 50 in a front portion 28 of the trailer, the living area 50 defined by a living floor 54 above the base floor 20, at least one door 52 and a ceiling 56 in common with the upper ceiling 24, with a space between the base floor 20 and the living floor 54 forming a second cargo area 60, and a tack area 70 between the living area 50 and the livestock area 30, the tack area having a front inner wall 74, a door 72 and a rear inner wall 76, the front inner wall 74 separating the tack area 70 from the living area 50 and the rear inner wall 76 separating the tack area 70 from the livestock area 30.

Figure 2:
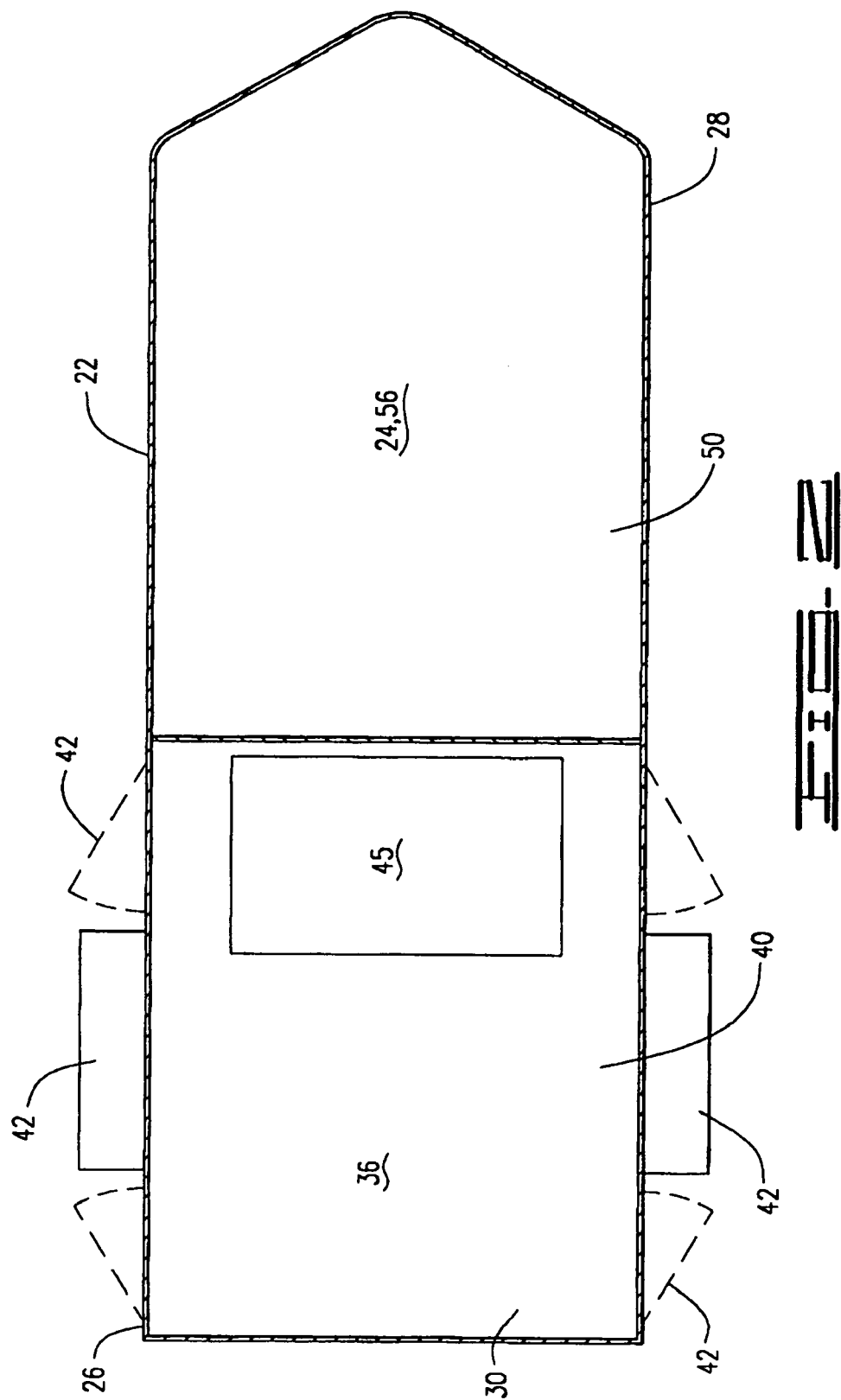
FIG. 2 is an upper view of the upper ceiling, the ceiling in the living area and the exposed first cargo area.

The first cargo area 40, in a first embodiment shown in FIG. 2 of the drawings, may include access to the first cargo area by a plurality of doors 42 along the outer walls 22. In a second embodiment, shown in FIG. 5 of the drawings, this access may be had by the upper ceiling 24 over the first cargo area 40 comprising a removable fabric cover 44 attaching to the outer walls 22 of the trailer, providing the entire upper ceiling over the first cargo area to be removed during loading and unloading, and then attached during transport to secure any contents of the first cargo area. In this second embodiment, the first cargo area may include a cargo frame 46, the removable fabric cover 44, and a fabric cover attaching means 48, shown in FIG. 5 of the drawings. The first cargo area may also include a first fresh water storage tank 45 including a gravity-fed dispensing means for providing fresh water to the living area or for watering livestock.

Figure 3:
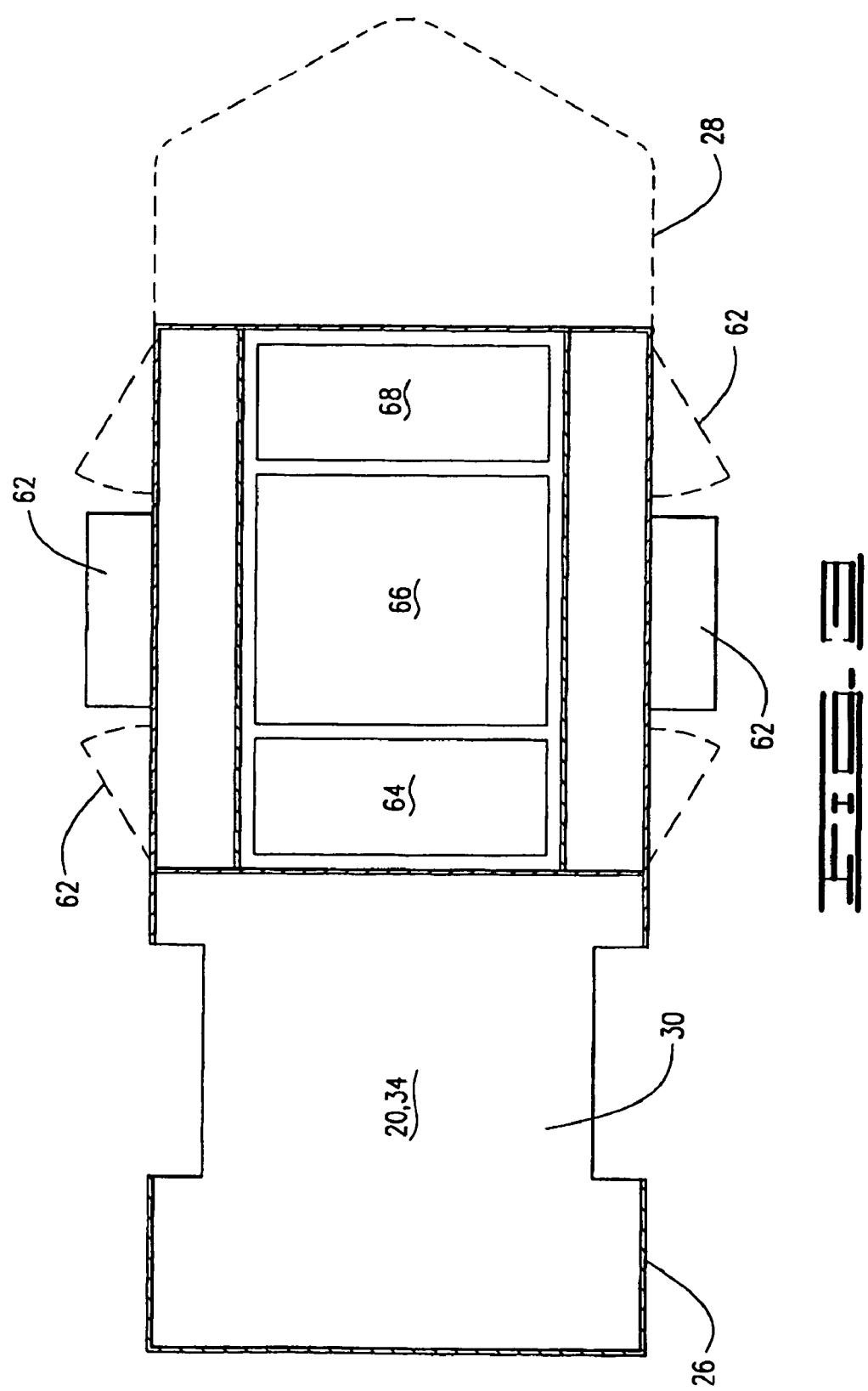
FIG. 3 is an upper view of the base floor, the livestock floor and the exposed second cargo area.

The second cargo area 60, shown in FIG. 3 of the drawings, under the living floor 54 of the living area 50, may also include access to the second cargo area through a plurality of doors 62 along the outer wall 22. This second cargo area 60 would preferably contain a grey water tank 64, used for washing the livestock or for other uses other than consumption, a black water tank 66 for storage of waste water, and a second fresh water tank 68 for fresh potable water, the tanks being affixed within the second cargo area 60 down the center, as indicated in FIG. 3, equalizing the weight distribution of the tanks upon the trailer. Accompanying plumbing would also be needed to connect the fresh water to the fresh water outlets in the trailer, to connect the grey water to the grey water to outlets and inlets and to connect the black water tanks to the sewer system.

Figure 4:
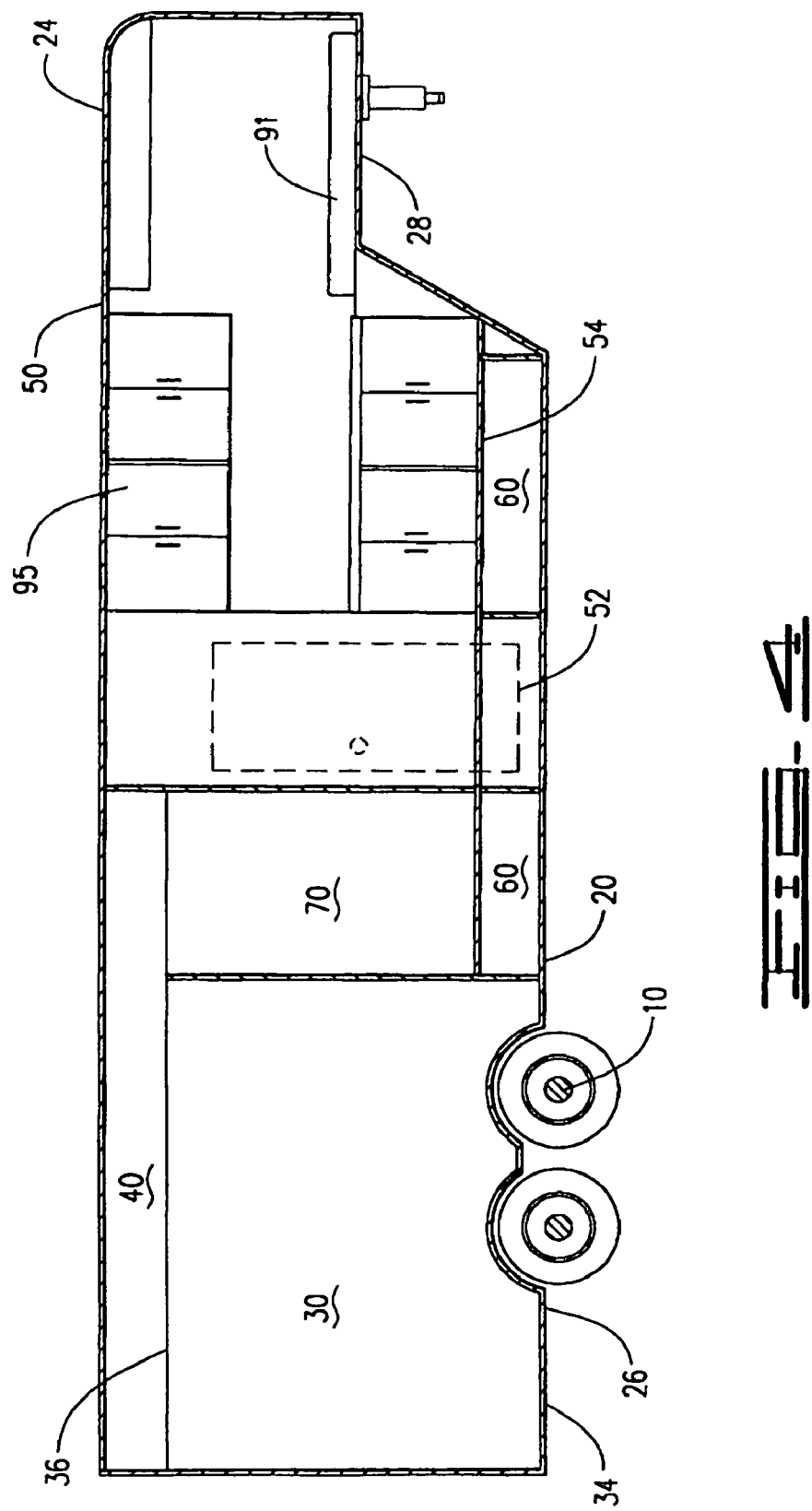
FIG. 4 is a side cross sectional view of the trailer.

The living area 50, shown in FIGS. 1 and 4 of the drawings, would most likely include fixtures generally provided in a travel trailer including beds 91, tables 92, kitchen stove 93, microwave, sink 99, refrigerator, food preparation area 94, cabinets 95, a lavatory 96 and shower 97 and closets 98. The tack area 70 may include accessories for hanging and storing tack. The livestock area 30 may include movable or stationary panels 38 and ventilation through the outer walls, as well as drains for removing animal waste.

In addition, it is contemplated that the trailer may be either a fifth wheel trailer, as represented in FIG. 4, or a trailer towed behind a vehicle using a ball hitch or box hitch. The outer shape of the trailer is not significant, other than to provide an overall height sufficient to allow for the livestock being hauled to fit within the livestock area of the trailer. The front of the trailer is also not significant, since trailers have varied shapes suited for wind resistance during towing. Therefore, the trailer may be provided in any suitable shape, size or dimension which would meet the need of the user, provided the trailer did not exceed applicable highway standards for transport and use.

The living area can be of any design and interior configuration deemed desirable by the builder of such trailer and the livestock area may also be designed to provide entry through a rear door as well as the previously described side doors. The tack room may also provide access through the livestock area, and the first cargo area may also have an access panel to the first cargo area for placement of feed or water into the livestock area from the first cargo area.

While the invention has been particularly shown and described with reference to a preferred embodiment thereof, it will be understood by those skilled in the art that changes in form and detail may be made therein without departing from the spirit and scope of the invention.

What is claimed is:

1. A combination livestock and travel trailer comprising:
   (a) a base floor, outer walls, and an upper ceiling, all mounted on at least one trailer axle;
   (b) a livestock area in a rear portion of the trailer, said livestock area defined by a livestock floor in common with the base floor, at least one door and a horse ceiling below the upper ceiling;
   (c) a space between the horse ceiling and the upper ceiling forming a first cargo area;
   (d) a living area in a front portion of the trailer, said living area defined by a living floor above the base floor, at least one door and a ceiling in common with the upper ceiling; and
   (e) a space between the base floor and the living floor forming a second cargo area.

2. The trailer of claim 1 further comprising a tack area between the living area and the livestock area, said tack area further having at least one door, a front inner wall and a rear inner wall, said front inner wall separating the tack area from the living area and said rear inner wall separating the tack area from the livestock area.

3. The trailer of claim 1 further comprising at least one door in the outer walls adapted to allow access to the first cargo area.

4. The trailer as disclosed of claim 1, wherein the upper ceiling over the first cargo area is removable, said upper ceiling over the first cargo area comprising:
   (a) the removable fabric cover attaching to the outer walls of the trailer;
   (b) a cargo frame; and
   (c) a fabric cover attaching means, whereby the upper ceiling over the first cargo area may be removed during loading and unloading of cargo, and attached during transport to secure any contents of the first cargo area.

5. The trailer of claim 1, wherein the first cargo area contains a first fresh water storage tank disposed therein.

6. The trailer of claim 1 wherein the second cargo area further comprises at least one door in the outer walls adapted to allow access to said second cargo area.

7. The trailer of claim 1, wherein the second cargo area further contains the following:
   (a) a grey water tank;
   (b) a black water tank; and
   (c) a second fresh water tank for fresh potable water, whereby said grey water tank, black water tank and second fresh water tank being secured within the second cargo area equalize the weight distribution of the grey water, black water, and fresh water tanks on the trailer.

8. A combination livestock and travel trailer comprising:
   (a) a base floor, outer walls, and an upper ceiling, all mounted on at least one trailer axle;
   (b) a livestock area in a rear portion of the trailer, said livestock area defined by a livestock floor in common with the base floor, at least one door, and a horse ceiling below the upper ceiling;
   (c) a space between the horse ceiling and the upper ceiling forming a first cargo area having access to said first cargo area by at least one door along the outer walls;
   (d) a living area in a front portion of the trailer, said living area defined by a living floor above the base floor, at least one door, and a ceiling in common with the upper ceiling; and
   (e) a space between the base floor and the living floor forming a second cargo area with access to said second cargo area through at least one door along the outer wall.

9. The trailer of claim 8 further comprising a tack area between the living area and the livestock area, said tack area further having a door, a front inner wall and a rear inner wall, said front inner wall separating the tack area from the living area and said rear inner wall separating the tack area from the livestock area.

10. The trailer of claim 8, wherein said first cargo area secures a first fresh water storage tank for providing fresh water to the living area and also for watering livestock, and said second cargo area includes a grey water tank, a black water tank, and a second fresh water tank for fresh portable water, whereby said grey water tank, black water tank and second fresh water tank being affixed within the second cargo area equalizing weight distribution of the grey water tank, black water tank and second fresh water tank upon the trailer.

11. The trailer of claim 9, wherein said first cargo area secures a first fresh water storage tank for providing fresh water to the living area and also for watering livestock, and said second cargo area includes a grey water tank, a black water tank, and a second fresh water tank for fresh potable water, whereby said grey water tank, black water tank and second fresh water tank being affixed within the second cargo area to equale weight distribution of the grey water tank, black water tank and second fresh water tank upon the trailer.

12. A combination livestock and travel trailer comprising:
   (a) a base floor, outer walls, and an upper ceiling, all mounted on at least one trailer axle;
   (b) a livestock area in a rear portion of the trailer, said livestock area defined by a livestock floor in common with the base floor, at least one door, and a horse ceiling below the upper ceiling;
   (c) a space between the horse ceiling and the upper ceiling forming a first cargo area, the upper ceiling over the first cargo area being removable, said upper ceiling over the first cargo area further comprising:
      (i) a removable fabric cover attaching to the trailer;
      (ii) a cargo frame; and
      (ii) a fabric cover attaching means, wherein the entire upper ceiling over the first cargo area is removed during loading and unloading, and attached during transport to secure any contents of the first cargo area;
   (d) a living area in a front portion of the trailer, said living area defined by a living floor above the base floor, at least one door, and a ceiling in common with the upper ceiling;
   (e) a space between the base floor and the living floor forming a second cargo area; and
   (f) a tack area between the living area and the livestock area, said tack area further having a door, a front inner wall and a rear inner wall, said front inner wall separating the tack area from the living area and said rear inner wall separating the tack area from the livestock area.

\* \* \* \* \*